United States Patent
Xin et al.

(10) Patent No.: US 12,278,738 B2
(45) Date of Patent: Apr. 15, 2025

(54) MODEL TRAINING METHOD AND APPARATUS

(71) Applicant: HUAWEI TECHNOLOGIES CO., LTD., Guangdong (CN)

(72) Inventors: Yang Xin, Shanghai (CN); Weiwei Chong, Shenzhen (CN); Xiaobo Wu, Shenzhen (CN); Yali Yan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/455,574

(22) Filed: Aug. 24, 2023

(65) Prior Publication Data
US 2023/0403206 A1 Dec. 14, 2023

Related U.S. Application Data

(63) Continuation of application No. PCT/CN2021/079359, filed on Mar. 5, 2021.

(51) Int. Cl.
G06F 13/00 (2006.01)
H04L 41/0866 (2022.01)
H04L 41/16 (2022.01)

(52) U.S. Cl.
CPC .......... *H04L 41/16* (2013.01); *H04L 41/0866* (2013.01)

(58) Field of Classification Search
CPC . H04L 41/16; H04L 41/0866; H04L 41/0853; H04L 41/145; H04L 67/1012; H04L 67/1097; H04L 67/12; H04L 67/131; H04L 69/24; H04L 67/1008; G06Q 10/067; G06Q 50/50; G06Q 2220/00; G06Q 99/00

USPC .............. 709/220–222, 201, 245, 223, 203; 706/16, 15, 14, 12
See application file for complete search history.

(56) References Cited

U.S. PATENT DOCUMENTS

| | | | |
|---|---|---|---|
| 11,188,791 B2* | 11/2021 | Choudhury | G06F 18/23213 |
| 2016/0234199 A1* | 8/2016 | Nah | H04L 63/0815 |
| 2020/0265301 A1 | 8/2020 | Burger et al. | |

(Continued)

FOREIGN PATENT DOCUMENTS

CN 111242282 A 6/2020

OTHER PUBLICATIONS

Lumin Liu et al: "Client-Edge-Cloud Hierarchical Federated Learning", Jun. 7-11, 2020, total 6 pages.

*Primary Examiner* — Kenneth R Coulter

(57) ABSTRACT

This application provides a model training method and apparatus. The method includes: obtaining first capability information and second capability information of a client; determining, based on the first capability information and the second capability information, that the client reports model information to a cloud server or an edge server; and sending first indication information to the client. The first indication information indicates the client to report the model information to the cloud server or the edge server. According to the model training method and apparatus provided in this application, in a horizontal federated training method in a hybrid mode, a manner of reporting local model information by the client may be flexibly selected based on capability information of the client, so that horizontal federated training efficiency can be improved.

16 Claims, 12 Drawing Sheets

(56) References Cited

U.S. PATENT DOCUMENTS

2021/0150269 A1* 5/2021 Choudhury ........ G06V 30/1985
2023/0247418 A1* 8/2023 Sun ..................... H04W 8/24
                                              370/328

* cited by examiner

MODEL TRAINING METHOD AND APPARATUS

CROSS-REFERENCE TO RELATED APPLICATIONS

This application is a continuation of International Application No. PCT/CN2021/079359, filed on Mar. 5, 2021. The disclosures of the aforementioned applications are incorporated herein by reference in these entireties.

TECHNICAL FIELD

This application relates to the field of communication technologies, and in particular, to a model training method and apparatus.

BACKGROUND

In horizontal federated learning, there is a cloud-edge-client mode. A process is as follows: First, each client reports, to a corresponding edge server, model information obtained through local training. Then, all edge servers in a system aggregate model information reported by all clients in respective coverage areas of all the edge servers to obtain an intermediate model, and report the intermediate model to a cloud server. The cloud server aggregates intermediate models again to obtain a final model, and the cloud server delivers an aggregated model to all the clients for local inference. However, such a strict process of performing aggregation by the edge server does not comply with a deployment scenario of an actual network. How to flexibly select reporting the model information directly by the client to the cloud server or reporting the model information to the cloud server after the edge server performs model aggregation is a problem to be urgently resolved in this application.

SUMMARY

According to a model training method and apparatus provided in this application, in a horizontal federated training method in a hybrid mode, a manner of reporting model information by a client may be flexibly selected based on capability information of the client, so that horizontal federated training efficiency can be improved.

According to a first aspect, a model training method is provided. The method may be performed by a cloud server, an edge server, or a third-party server, or may be performed by a chip or a circuit configured in the foregoing server. This is not limited in this application. The method includes: obtaining first capability information and second capability information of a client; determining a target server based on the first capability information and the second capability information, where the target server is a server to which the client reports model information, and the target server includes the cloud server or the edge server; and sending indication information to the client. The indication information indicates the client to report the model information of the client to the target server.

According to the solution provided in this application, the server may determine, based on obtained capability information of the client, a manner of reporting the model information by the client, so that the manner of reporting the model information by the client in the system is more flexible, and horizontal federated training efficiency can be improved.

With reference to the first aspect, in some implementations of the first aspect, the first capability information includes at least one of the following information of the client: memory information, hard disk information, computing capability information, load information, and channel bandwidth information; or the second capability information includes at least one of the following information of the client: a federated learning client capability, a federated learning algorithm type, and region information.

With reference to the first aspect, in some implementations of the first aspect, the method further includes: obtaining requirement information of the cloud server, where the requirement information includes a quantity of clients and/or a data length; and determining the target server based on the first capability information, the second capability information, and the requirement information.

With reference to the first aspect, in some implementations of the first aspect, the first indication information further includes address information of the cloud server and/or address information of the edge server.

Based on the foregoing solution, the requirement information of the cloud server is obtained to further control a quantity of clients that participate in training and/or the data length of clients that participate in training, so that training efficiency can be further improved.

According to a second aspect, a model training method is provided. The method may be performed by a cloud server. Alternatively, the operation may be performed by a chip or a circuit configured in the cloud server. This is not limited in this application. The method includes: The cloud server receives model information of a first client and model information of an edge server. The model information of the edge server is determined based on model information of a second client. The cloud server determines target model information based on the model information of the first client and the model information of the edge server. The cloud server sends the target model information to the first client and the edge server.

It should be noted that, in this application, the first client is different from the second client. It should be understood that in a model training process, model information of any client is not reported to both the cloud server and the edge server.

According to the solution provided in this application, the cloud server may train the target model by receiving the model information of the first client and the model information of the edge client (for example, obtain the target model by aggregating the model information of the first client and model information of an edge client). This hybrid horizontal federated learning training system can have an advantage of a large quantity of datasets in a cloud-client horizontal federated learning training system in which the client directly reports the model information to the cloud server, in addition, an advantage of an edge-client horizontal federated learning training system can be used to effectively alleviate a network congestion caused by a large quantity of the client. Therefore, the training method of the system is more flexible and effective.

With reference to the second aspect, in some implementations of the second aspect, the method further includes: The cloud server sends first indication information to the first client. The first indication information indicates the first client to report the model information of the first client to the cloud server.

With reference to the second aspect, in some implementations of the second aspect, the first indication information includes address information of the cloud server.

With reference to the second aspect, in some implementations of the second aspect, the method further includes: The cloud server sends second indication information to the second client. The second indication information indicates the second client to report the model information of the second client to the edge server.

With reference to the second aspect, in some implementations of the second aspect, the method further includes: The second indication information includes address information of the edge server.

With reference to the second aspect, in some implementations of the second aspect, the method further includes: The cloud server sends third indication information to the edge server. The third indication information indicates the edge server to report the model information of the edge server to the cloud server.

With reference to the second aspect, in some implementations of the second aspect, the third indication information includes address information of the second client and/or the address information of the cloud server.

It should be understood that, when the cloud server sends the third indication information to the edge server to indicate the edge server to report the model information of the edge server to the cloud server, the indication information may include the address information of the second client, and the address information is used by the edge server to learn that client model information that needs to be aggregated is from the second client corresponding to the address information. At the same time, because the cloud server may communicate with a plurality of edge servers, the address information of the cloud server may be an Internet Protocol IP address and/or a channel port number used by each edge server the cloud server to communicate with each other.

With reference to the second aspect, in some implementations of the second aspect, the cloud server sends requirement information to the edge server. The requirement information includes a sum of a quantity of first clients and a quantity of second clients and/or a sum of data lengths of the first clients and the second clients, and the requirement information is used to determine the first client and the second client.

Based on the foregoing solution, the cloud server determines a manner of reporting the model information by the client, so that horizontal federated training efficiency can be improved effectively.

According to a third aspect, a model training method is provided. The method may be performed by an edge server, or may be performed by a chip or a circuit configured in the edge server. This is not limited in this application. The method includes: The edge server receives model information of a second client; the edge server determines model information of the edge server based on the model information of the second client; and the edge server sends the model information of the edge server to the cloud server.

With reference to the third aspect, in some implementations of the third aspect, the method further includes: The edge server receives first indication information from the cloud server. The first indication information indicates the edge server to report the model information of the edge server to the cloud server.

With reference to the third aspect, in some implementations of the third aspect, the first indication information includes address information of the second client and/or address information of the cloud server.

With reference to the third aspect, in some implementations of the third aspect, the method further includes: The edge server sends second indication information to the second client. The second indication information indicates the second client to report the model information of the second client to the edge server.

With reference to the third aspect, in some implementations of the third aspect, the second indication information includes address information of the edge server.

With reference to the third aspect, in some implementations of the third aspect, the method further includes: The edge server sends third indication information to a first client. The third indication information indicates the first client to report model information of the first client to the cloud server.

With reference to the third aspect, in some implementations of the third aspect, the second indication information includes the address information of the cloud server.

Based on the foregoing solution, the edge server determines a manner of reporting the model information by the client, so that horizontal federated learning training efficiency can be improved.

According to a fourth aspect, a model training apparatus is provided, including a processing module and a storage module.

Modules in the apparatus are respectively configured to perform the steps of the method provided in any one of the first aspect or the possible implementations of the first aspect.

In a design, the apparatus is a model training chip, and the model training chip may include an input circuit or interface configured to send information or data, and an output circuit or interface configured to receive the information or the data.

In another design, the apparatus is a server, and may be a cloud server, an edge server, or another third-party server. This is not limited in this application. The server may include a transmitter configured to send information or data, and a receiver configured to receive the information or the data.

According to a fifth aspect, a model training apparatus is provided, including a processing unit and a storage unit.

Units in the apparatus are respectively configured to perform the steps of the method provided in any one of the second aspect or the possible implementations of the second aspect.

In a design, the apparatus is a model training chip, and the model training chip may include an input circuit or interface configured to send information or data, and an output circuit or interface configured to receive the information or the data.

In another design, the apparatus is a cloud server. The cloud server may include a transmitter configured to send information or data, and a receiver configured to receive the information or the data.

According to a sixth aspect, a model training apparatus is provided, including a processing unit and a storage unit.

Units in the apparatus are respectively configured to perform the steps of the method provided in any one of the third aspect or the possible implementations of the third aspect.

In a design, the apparatus is a model training chip, and the model training chip may include an input circuit or interface configured to send information or data, and an output circuit or interface configured to receive the information or the data.

In another design, the apparatus is an edge server. The edge server may include a transmitter configured to send information or data, and a receiver configured to receive the information or the data.

According to a seventh aspect, a model training system is provided, including the model training device provided in the foregoing aspects.

In a possible design, the model training system may further include another device that interacts with the model training device in the solutions provided in embodiments of this application.

According to an eighth aspect, a computer program product is provided. The computer program product includes a computer program (which may be also referred to as code or instructions). When the computer program is run, a computer is enabled to perform the method according to any one of the first aspect to the third aspect and the possible implementations of the first aspect to the third aspect.

According to a ninth aspect, a computer-readable medium is provided. The computer-readable medium stores a computer program (which may also be referred to as code or instructions). When the computer program is run on a computer, the computer is enabled to perform the method according to any one of the first aspect to the third aspect and the possible implementations of the first aspect to the third aspect.

According to a tenth aspect, a chip system is provided, including a memory and a processor. The memory is configured to store a computer program, and the processor is configured to invoke the computer program from the memory and run the computer program, so that a model training device equipped with the chip system performs the method according to any one of the first aspect to the third aspect or the possible implementations of the first aspect to the third aspect.

The chip system may include an input circuit or interface configured to send information or data, and an output circuit or interface configured to receive the information or the data.

DESCRIPTION OF EMBODIMENTS

Figure 1:
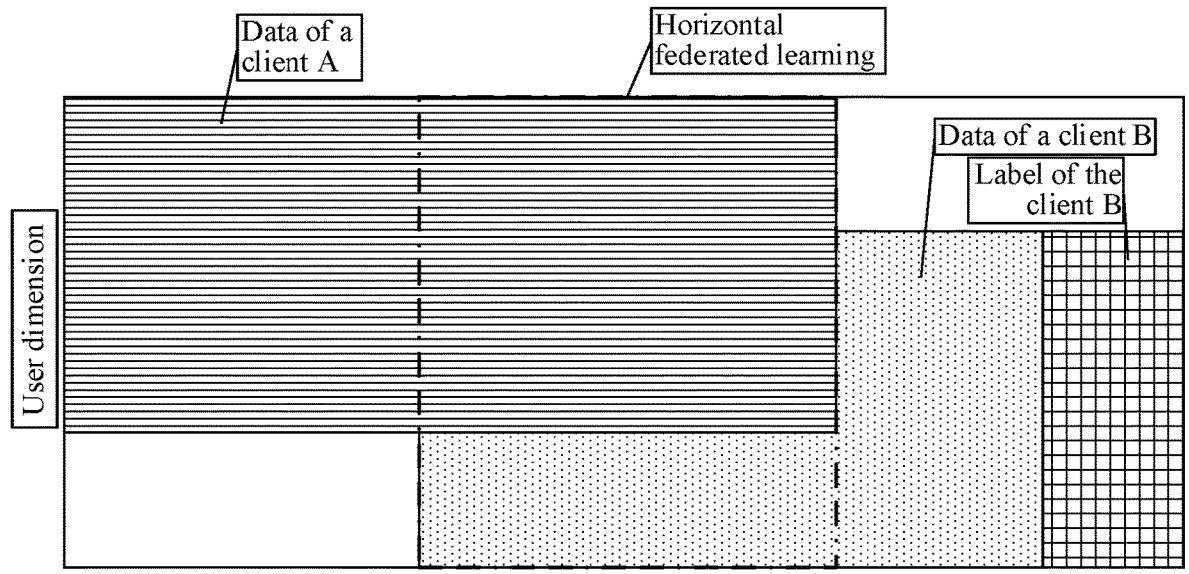
FIG. 1 is a schematic diagram of horizontal federated learning.

The following describes technical solutions of this application with reference to accompanying drawings.

A wireless communication system mentioned in embodiments of this application includes but is not limited to a global system for mobile communication (GSM), a long term evolution (LTE) frequency division duplex (FDD) system, an LTE time division duplex (TDD) system, an LTE system, a long term evolution-advanced (LTE-A) system, a next-generation communication system (for example, a 6G communication system), a fusion system with diverse access systems, or an evolved system.

A terminal device in embodiments of this application may include various access terminals, mobile devices, user terminals, or user equipment (UE) that have a wireless communication function. For example, the terminal device may be a mobile phone, a tablet (Pad), a computer with a wireless transceiver function, a virtual reality (VR) terminal device, an augmented reality (AR) terminal device, a wireless terminal in industrial control, a machine type communication (MTC) terminal, customer-premises equipment (CPE), a wireless terminal in self-driving, a wireless terminal in remote medical, a wireless terminal in a smart grid, a wireless terminal in transportation safety, a wireless terminal in a smart city, a wireless terminal in a smart home, or the like. An application scenario is not limited in embodiments of this application. In this application, the foregoing terminal device and a chip that can be disposed in the foregoing terminal device are collectively referred to as a terminal device.

As an example instead of a limitation, in embodiments of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, shoes, or the like. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches, smart glasses, or the like, and include devices that focus on only one type of application function and need to collaboratively work with another device such as smartphones, for example, various smart bands, or smart jewelry for monitoring physical signs.

This application relates to federated learning. Federated learning (FL) is a distributed machine learning technology or machine learning framework. Currently, federated learning can establish, in a manner of parameter exchange in an encryption mechanism, a public model without sharing local data and violating data privacy laws and regulations. The public model can achieve the same model performance (model performance, such as accuracy, a recall rate, or the like) or model effect as a model obtained by aggregating and training data. However, when the public model is established, the data is not moved, privacy is not disclosed, and data compliance is not affected. In this way, a created model serves only a local target in a respective region.

Figure 2:
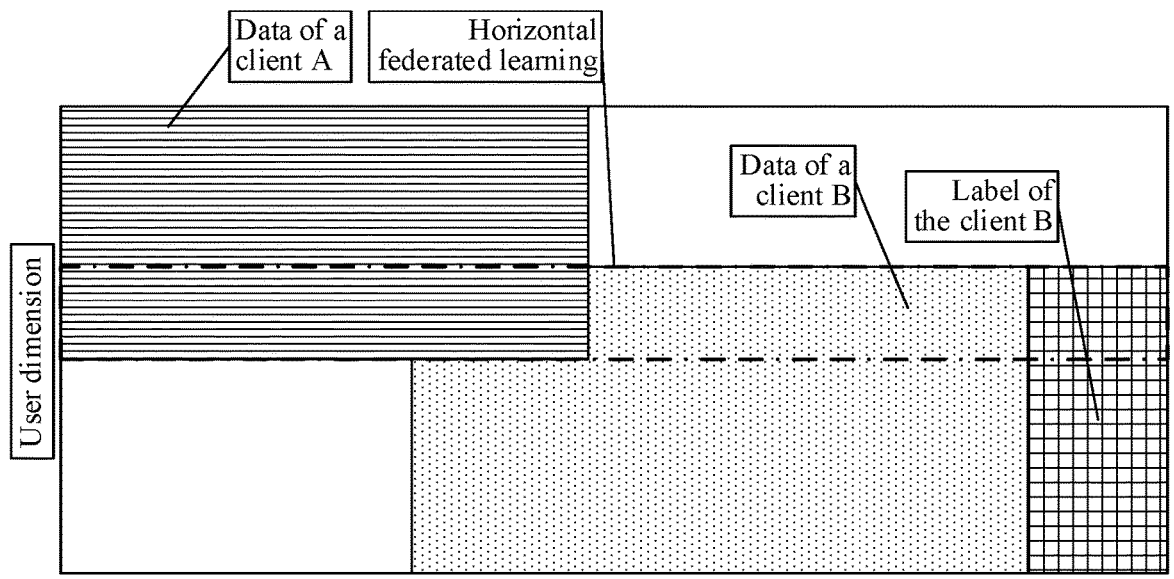
FIG. 2 is a schematic diagram of vertical federated learning.

Federated learning may be classified into horizontal federated learning and vertical federated learning, as shown in FIG. 1 and FIG. 2 respectively. In federated learning, a horizontal row of a data matrix (for example, a table) represents a training sample, and a vertical column represents a data feature (or a label). Horizontal federated learning is essentially a combination of samples, and is applicable to a case in which data features of participants overlap more but sample identifiers overlap less. Federated learning may be performed by combining a plurality of rows of samples that are of a plurality of participants and that have a same feature, that is, training data of each participant is horizontally divided. Horizontal federation increases a total quantity of training samples. Vertical federated learning is essentially a combination of features, and is applicable to a case in which training sample identifiers of participants overlap more but data features overlap less. Federated learning may be performed by combining different data features of common samples of a plurality of participants, that is, training data of each participant is vertically divided.

Figure 3:
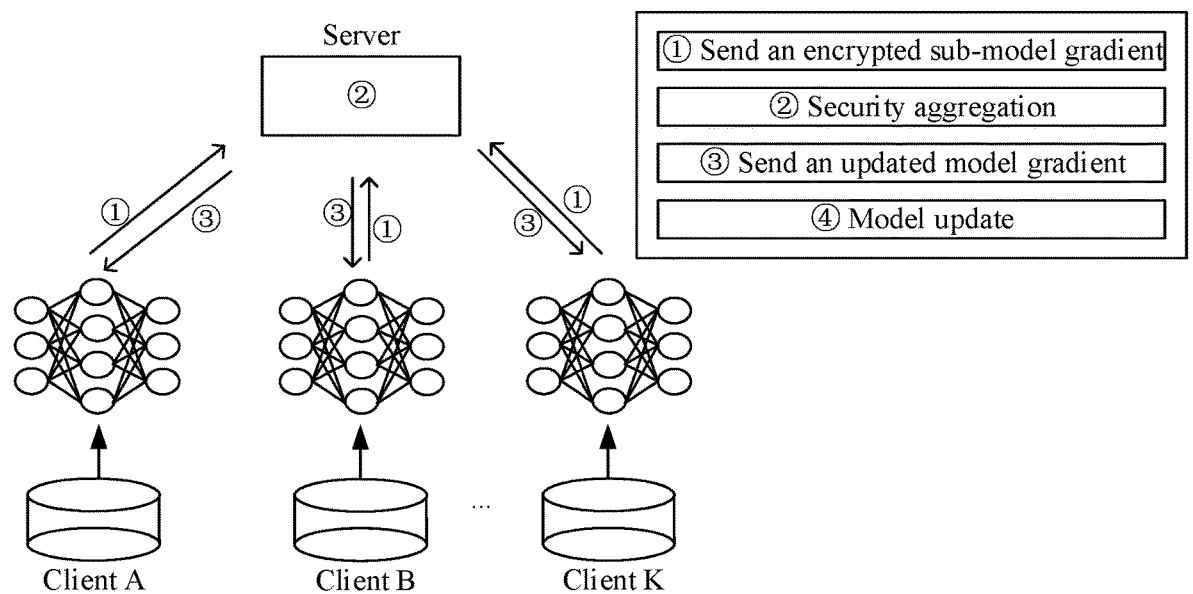
FIG. 3 is a schematic diagram of a training process of horizontal federated learning.

FIG. 3 is a schematic diagram of a training process of horizontal federated learning. It can be learned that horizontal federation includes a central server node and a plurality of edge client nodes. Raw data is distributed on each client node, the server node does not have the raw data, and the client node is not allowed to send, to the server node, the raw data used for training.

First, it is assumed that there are K clients in total. In this case, a dataset on each client node may be represented in the following form:

$\{x_a^A, y_a^A\}_a \in D_A$, $\{x_b^B, y_b^B\}_b \in D_B$, . . . , and $\{x_k^K, y_k^K\}_k \in D_K$, x is sample data, and y is label data corresponding to the sample data. In horizontal federated learning, each piece of sample data includes a label, in other words, the label and the data are stored together.

Then, a data analysis module on each client node may train a model of the data analysis module based on a linear regression algorithm. The model is referred to as a submodel or a local model, that is:

$h(x_a) = \Theta_A x_a^A$, $h(x_b) \times \Theta_B x_b^B$, . . . , and $h(x_k) = \Theta_K x_k^K$ It is assumed that a loss function used for linear regression is a mean squared error (MSE). In this case, a target function of training each submodel is as follows:

$$\min L_I = \sum_i \|\Theta_I x_i^I - y_i^I\|^2 + \frac{\lambda}{2}\|\Theta_I\|^2,$$

$$I = A, B, \ldots, K, i = 1, 2, \ldots, n_I$$

$n_I$ is a quantity of samples in an $I^{th}$ client.

It should be understood that an entire training process is to minimize a loss function $L_I$.

A linear regression model is used as an example, a training process may be divided into the following five steps:

Step 1: Each client node generates a submodel gradient:

$$\frac{\partial L_I}{\partial \Theta_I} = \sum_i (\Theta_I x_i^I - y_i^I) x_i^I + \lambda \Theta_I$$

Step 2: Each client reports a quantity of samples and a local gradient value to a server, that is, $n_I$ and $\partial L_I/\Theta_I$.

Step 3: After the server receives the quantity of samples of each client and a submodel gradient value, the server performs aggregation on the gradient value:

$$\frac{1}{\|K\|} \sum_I \frac{\partial L_I}{\partial \Theta_I} * P_I$$

$\|K\|$ is a quantity of clients, and $P_I = n_I/\Sigma_I n_I$.

Step 4: The server delivers an aggregated gradient to each client node that participates in training, and then the client node performs local update on a model parameter:

$$\Theta_I := \Theta_I + \alpha \frac{1}{\|K\|} \sum_I \frac{\partial L_I}{\partial \Theta_I} * P_I$$

That is, each client node replaces local $\Theta_I$. $\alpha$ is a training optimization step.

Step 5: After the client node updates the submodel, the client node calculates a value of the loss function $L_I$. If the training is not completed, the client node proceeds to step 1 to continue to perform the horizontal federated training process.

After the training is completed, each client node retains a local model for local inference.

It should be understood that, in the foregoing training process, the server node may control, based on a quantity of iterations, the training to end, for example, terminates the training after the training is performed for 10000 times, or control, by setting a threshold of the loss function, the training to end, for example, ends the training when $L_I \leq 0.0001$, when a difference between results of two adjacent times of training is less than 0.0001, or the like. Another manner indicating that the training ends is not limited in this application.

It should be noted that, in this application, model information of the client is the quantity of samples and the local gradient value that are determined by the client based on local data, that is, $n_1$ and $\partial L_I/\partial \Theta_I$. Model information of an edge server is corresponding gradient information obtained by performing aggregation by the edge server on model information reported by the client and a quantity of samples corresponding to model information obtained by the edge server within a coverage area. Target model information of a cloud server is corresponding gradient information obtained by performing aggregation by the cloud server on model information directly reported by the client and model information reported by the edge server.

Figure 4:
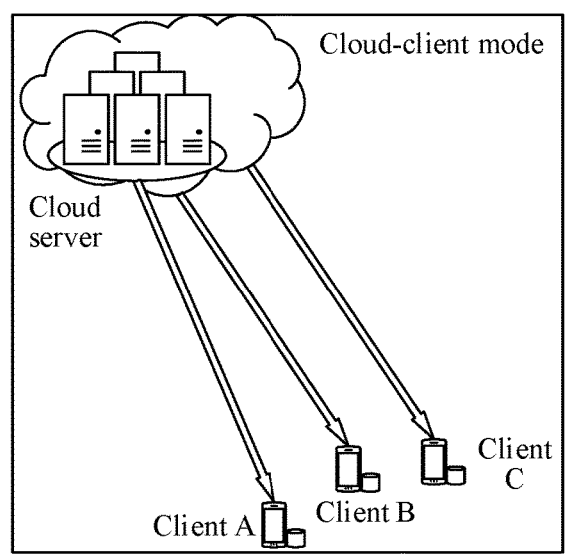
FIG. 4 is a schematic diagram of an architecture of horizontal federated learning.

The following describes three different architectures of horizontal federated learning. FIG. 4 is an architecture of horizontal federated learning in a cloud-client mode, FIG. 5 is an architecture of horizontal federated learning in an edge-client mode, and FIG. 6 is an architecture of horizontal federated learning in a cloud-edge-client mode.

It should be noted that horizontal federation includes one coordinator and several participants. The participants are responsible for performing model training by using local data, and the coordinator is responsible for performing aggregation on models of the participants.

First, in the cloud-client mode in FIG. 4, a total quantity of participating clients may reach millions, providing a large quantity of datasets needed for deep learning. However, a model locally trained by the client may be extremely large. For example, using a neural network model as an example, assuming that there are 1000 input parameters, there are 200 hidden layers, and there are 500 nodes at each hidden layer, a size of the neural network model obtained by training by each client may reach a level of 100 MB. Due to causes such as network congestion and the like, communication between the client and a cloud server becomes slow and unpredictable. If a network is congested, it may take a long time to transmit a model to a cloud, resulting in extremely low training efficiency. In addition, data distribution of each client is also inconsistent, resulting in inconsistent training duration. This affects duration of an entire horizontal federated training.

Figure 5:
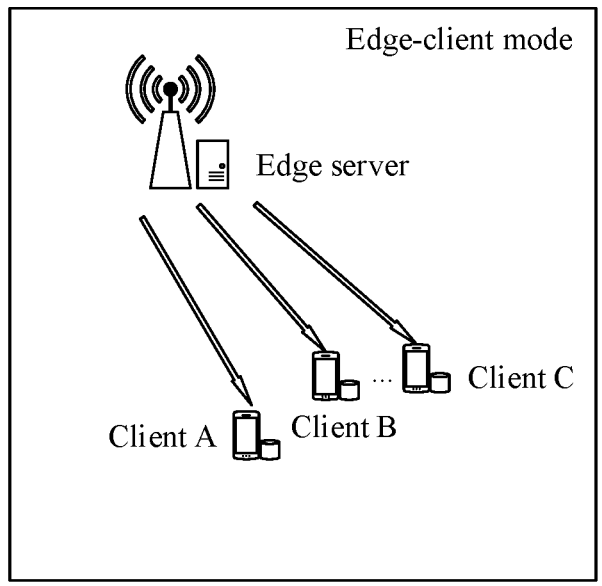
FIG. 5 is a schematic diagram of an architecture of another horizontal federated learning.
Figure 6:
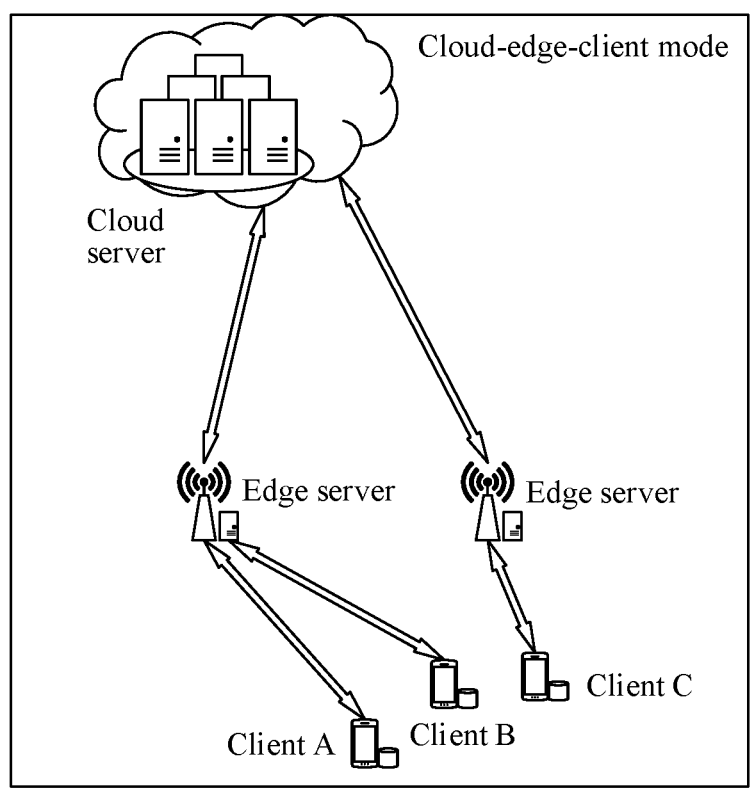
FIG. 6 is a schematic diagram of an architecture of still another horizontal federated learning.

The edge-client mode in FIG. 5 can effectively alleviate impact, on a cloud server, brought by reporting a model by a client. In other words, after completing model training, the client may report the model to a local edge server, then the edge server performs local aggregation on a submodel reported by the client, and then the edge server sends an aggregated model to the client for inference. However, data amount is insufficient because a quantity of clients that each edge server can access is limited, and consequently, training performance is inevitably lost.

The cloud-edge-client mode in FIG. 6 is a compromise between the foregoing two modes. A client first uploads a submodel to an edge server, the edge server performs local aggregation on the submodel, and then uploads an aggregated model to a cloud server, and the cloud server performs final aggregation on intermediate models aggregated by all edge servers.

Figure 7:
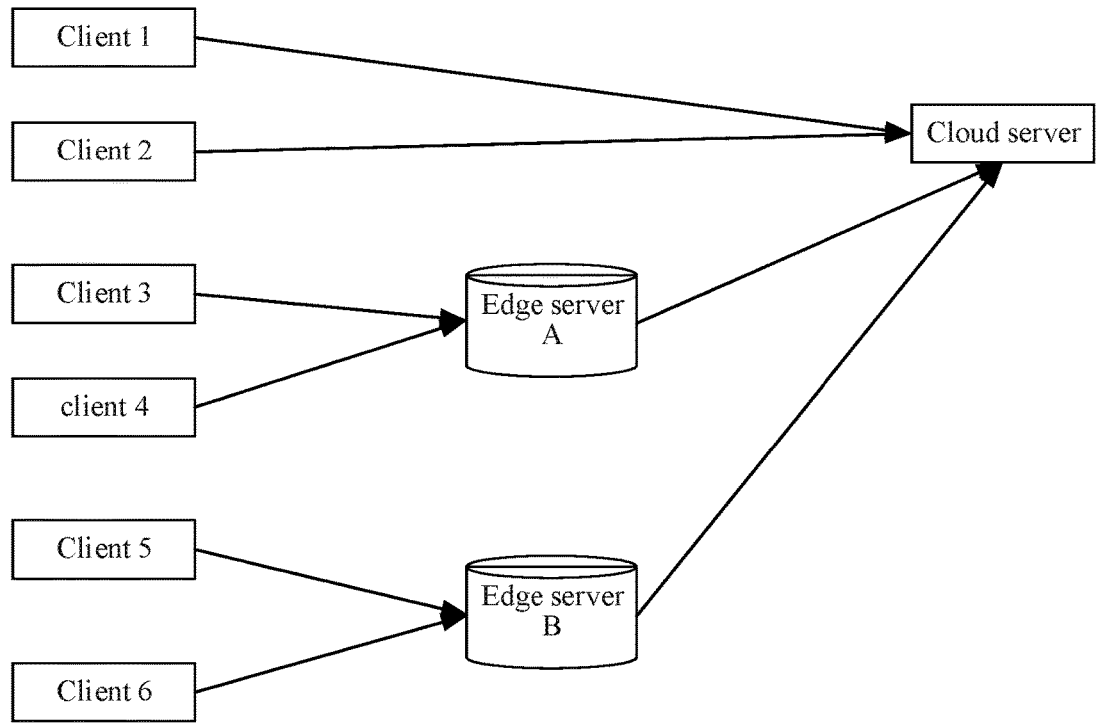
FIG. 7 is a schematic diagram of horizontal federated learning in a system architecture in a hybrid horizontal federated training mode.

As shown in FIG. 7, a system architecture to which this application is applicable is mainly a system architecture in a hybrid horizontal federated training mode. In FIG. 7, a client and a cloud server may report a submodel in a cloud-client mode, or may report the submodel in a cloud-edge-client mode.

Figure 8:
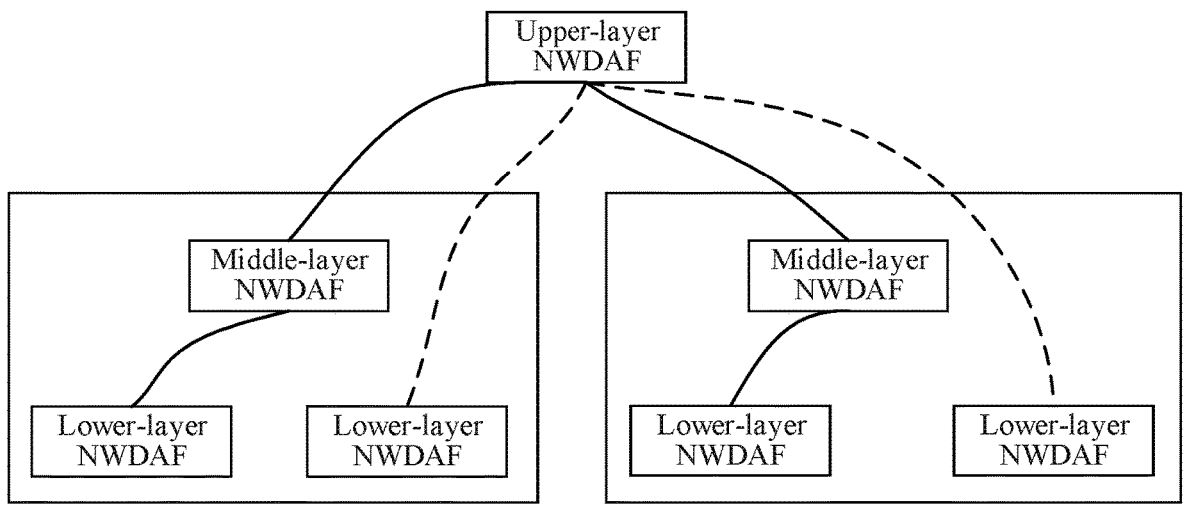
FIG. 8 is a schematic diagram of horizontal federated learning in an NWDAF-based 5G network architecture.

Further, this application may also be extended to another system architecture, for example, horizontal federated learning in an NWDAF-based 5G network architecture in FIG. 8. A lower-layer network data analytics function (NWDAF) and a middle-layer NWDAF are participants in a horizontal federated process, and an upper-layer NWDAF is a coordinator in the horizontal federated process.

Figure 9:
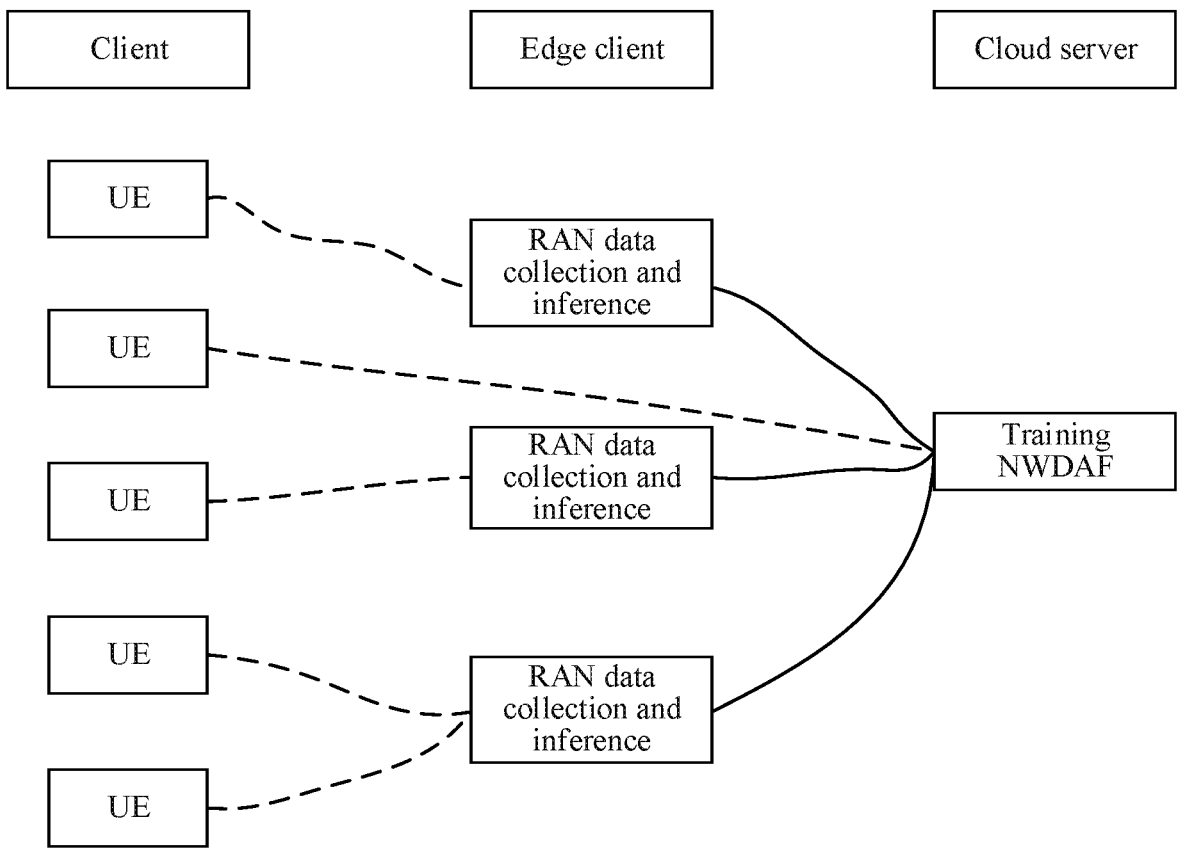
FIG. 9 is a schematic diagram of horizontal federated learning in an NWDAF-RAN scenario.

Alternatively, this application may be extended to horizontal federated learning in an NWDAF-RAN scenario in FIG. 9. In this scenario, horizontal federation is performed between a plurality of UEs, the UE and the RAN are participants in a horizontal federated process, and the NWDAF is a coordinator in the horizontal federated process.

It should be understood that another system architecture similar to that in FIG. 7 to FIG. 9 or another scenario that this application may further have, to be specific, a system architecture or a scenario in which a participant and a coordinator of horizontal federation meet the foregoing three included relationships should fall within the protection scope of this application. This is not limited in this application.

Figure 10:
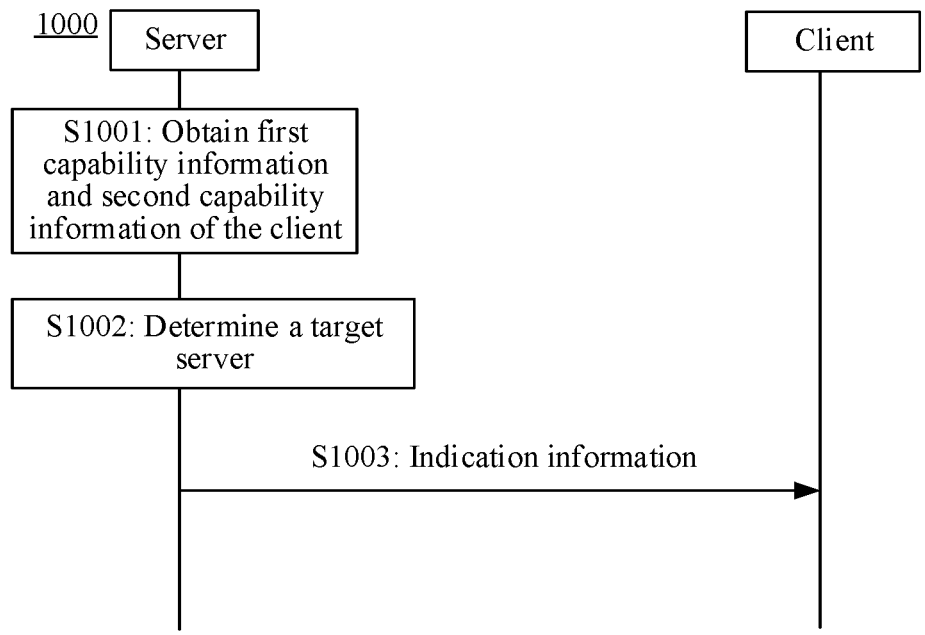
FIG. 10 is a schematic interaction flowchart of a federated learning training method according to an embodiment of this application.

FIG. 10 is a schematic flowchart of a federated learning training method provided in this application. The method 1000 includes the following steps:

S1001: Obtain first capability information and second capability information of a client.

It should be noted that, in this embodiment, the first capability information and the second capability information of the client may be obtained by a cloud server, an edge server, or another third-party server. This is not limited in this application.

Specifically, the first capability information may include one or more of memory information, hard disk information, computing capability information, load information, and channel bandwidth information. It should be understood that the first capability information dynamically changes, in other words, is at different moments. The first capability information changes because the client is located at different locations, or network channels, environment factors, or service scenarios of the client are different. It should be explained that the first capability information is first capability information currently available to the client. For example, the memory information is memory information currently available to the client.

Specifically, the second capability information may include one or more of a federated learning client capability, a federated learning algorithm type, and region information. It should be understood that the second capability information is inherent capability information of the client, to be specific, the second capability information does not change due to a change of an environment in which the client is located, a condition of the network channel of the client, or the service scenario. In addition, the second capability information is not limited to the capability information listed above. The second capability information may be pre-stored in a server, for example, may be pre-stored in preconfiguration information of the server. Certainly, the second capability information may alternatively be received from an external device. For example, the server may send request information to the client to request the second capability information of the client. After receiving the request information, the client returns a response message carrying the second capability information to the server. A method for obtaining the second capability information is not limited in this application.

S1002: Determine a target server based on the first capability information and the second capability information.

Specifically, the server determines, based on the first capability information, an object to which the client that participates in federated training reports model information, that is, whether the client directly reports the model information to the cloud server or reports the model information to the edge server.

It should be understood that, it can be learned, based on the foregoing descriptions, that the first capability information is dynamic information. Therefore, the server determines, based on the first capability information of the client in a training period of time, an object to which the client reports the model information. For example, when the server determines that a memory size of the obtained first capability information of the client is greater than or equal to 1 GB, or a hard disk size is greater than or equal to 10 GB, or a quantity of graphical processing units (GPUs) in a computing capability is greater than or equal to 4, or load is greater than or equal to 3, and bandwidth between the client and the cloud server is greater than or equal to 5 Mbit/s, the server determines that the client may directly report the model information to the cloud server. On the contrary, if one or more parameters in the first capability information of the client are all less than the foregoing values, the server determines that the client reports the model information to the edge server.

It should be noted that different values may be set for the foregoing values during different training periods of time. When the first capability information of the client is greater than or equal to the value, it indicates that the client has a low requirement for training bandwidth or has good channel quality with the cloud server, and it is appropriate for the client to directly report the model information to the cloud server, without a need of first reporting the model information to the edge server, and then reporting an aggregated model to the cloud server after performing aggregation by the edge server, to further improve federated training efficiency.

In addition, the server further selects, based on the obtained second capability information, a client that participates in training. For example, in one federated training, the server performs federated training by using a linear regression algorithm, and a client that does not support the linear regression algorithm does not participate in the federated training.

S1003: Send first indication information to the client. The first indication information indicates the client to report the model information to the cloud server or the edge server.

Specifically, when the server determines, based on step 1002, that the client reports the model information to the cloud server, the server sends the first indication information to the client. The first indication information may include address information of the cloud server. When the server determines, based on step 1002, that the client reports the model information to the edge server, the server sends the first indication information to the client. The first indication information may include address information of the edge server.

Therefore, according to the model training method provided in this application, the server may dynamically determine, based on capability information of the client, whether the client reports the model information to the cloud server or the edge server, so that the client reports the model information more flexibly in a horizontal federated learning training system, to further improve federated training efficiency.

It should be noted that the address information of the client, the cloud server, or the edge server in the present disclosure may be one or more of the following information corresponding to the client, the cloud server, or the edge server: identification information, an Internet Protocol IP address, a tunnel endpoint identifier (TEID), a uniform resource locator (URL), or a fully qualified domain name (FQDN). For other descriptions of address information, refer to the descriptions herein. Details are not described again.

Figure 11:
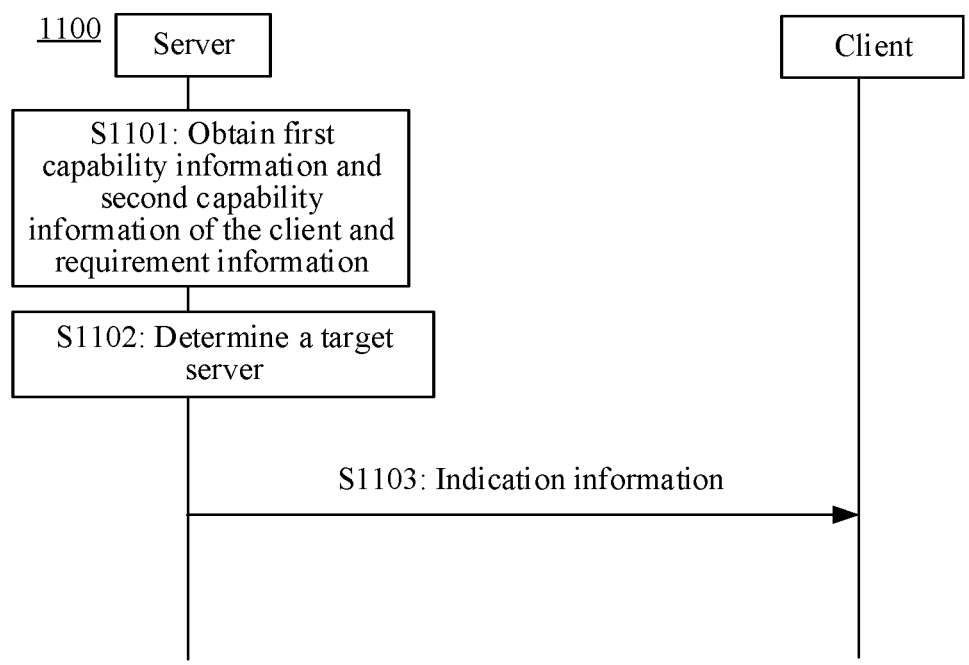
FIG. 11 is a schematic interaction flowchart of another federated learning training method according to an embodiment of this application.

According to the method 1000 in FIG. 10, FIG. 11 is a schematic flowchart of a federated learning training method 1100 according to this application. The method further includes the following steps.

The server obtains requirement information of the cloud server. The requirement information includes a quantity of clients and/or a data length. In this case, the server determines, based on the obtained first capability information, second capability information, and requirement information, a way of reporting the model information by the client.

It should be understood that, the server may obtain the first capability information and the second capability information of a plurality of clients. In this case, because training time is limited and a training result does not change significantly with a quantity of clients that participate in training, the server may preset, before the training, the quantity of clients that participate in training and the data length of each client, that is, the requirement information, to avoid a case in which training efficiency is low due to an invalid training process.

It should be understood that, in this embodiment, a step same as the step in FIG. 10 is not described herein again for brevity.

Figure 12A:
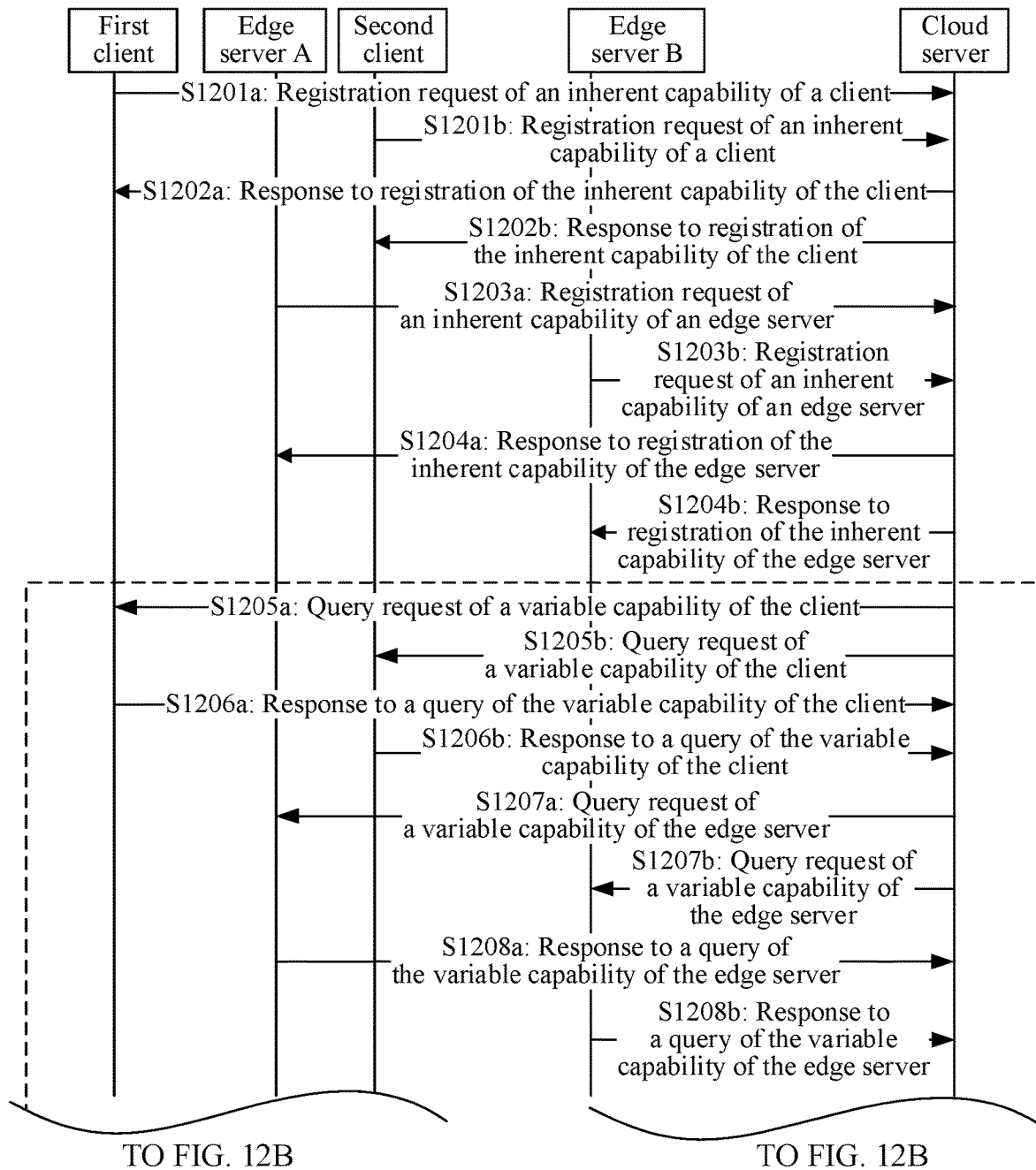
FIG. 12A and FIG. 12B are a schematic interaction flowchart of still another federated learning training method according to an embodiment of this application.
Figure 12B:
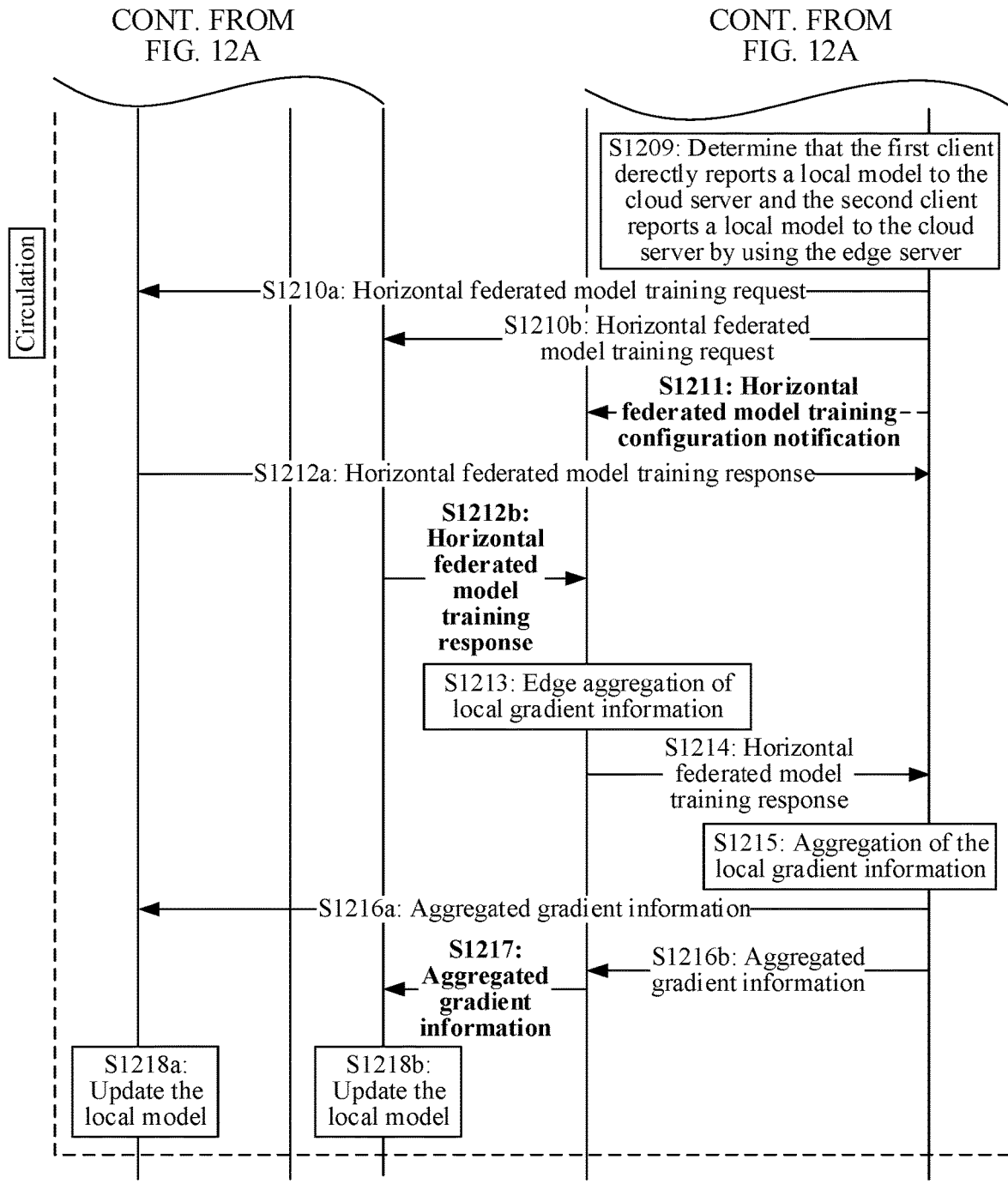
Figure 13A:
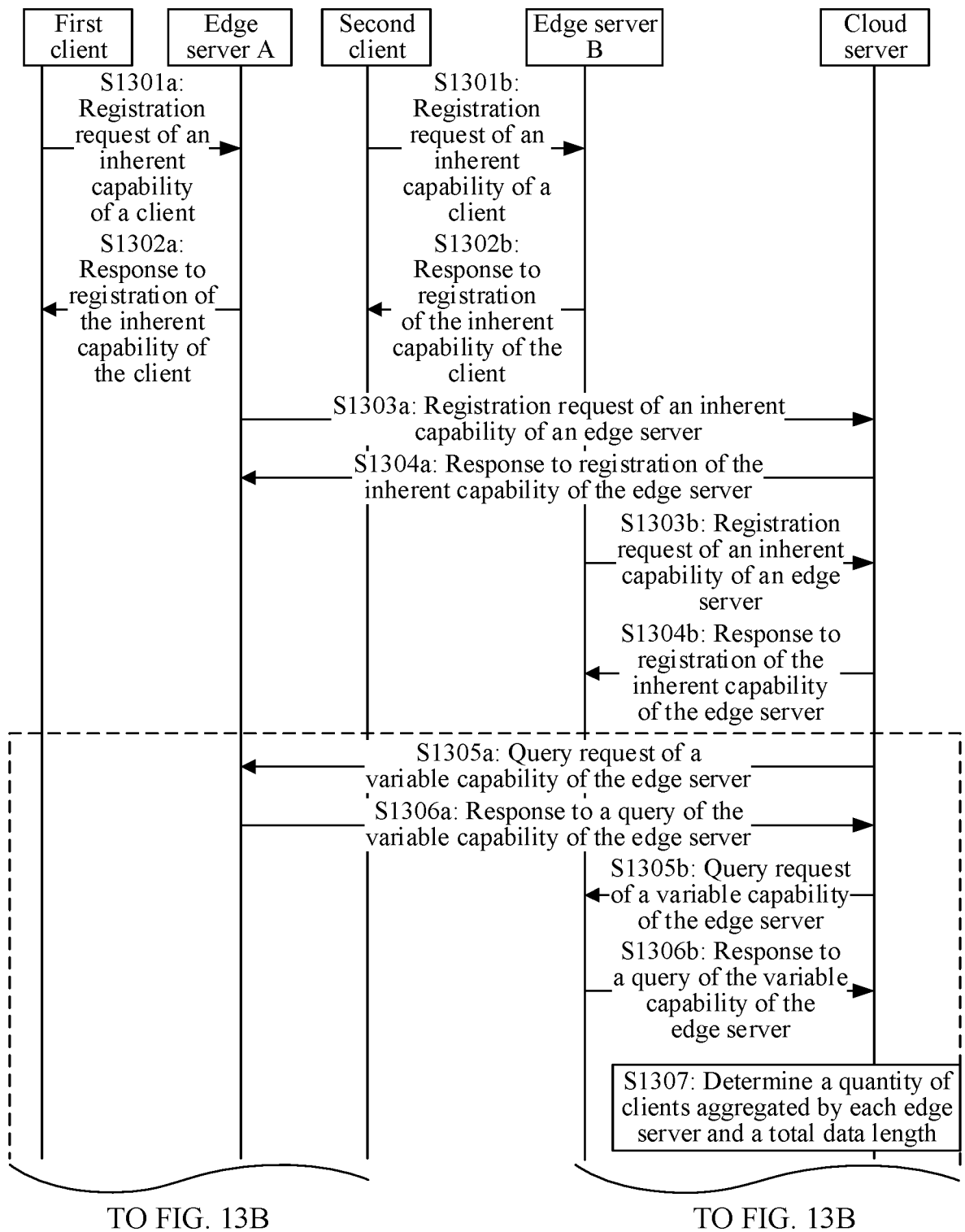
FIG. 13A and FIG. 13B are a schematic interaction flowchart of yet another federated learning training method according to an embodiment of this application.
Figure 13B:
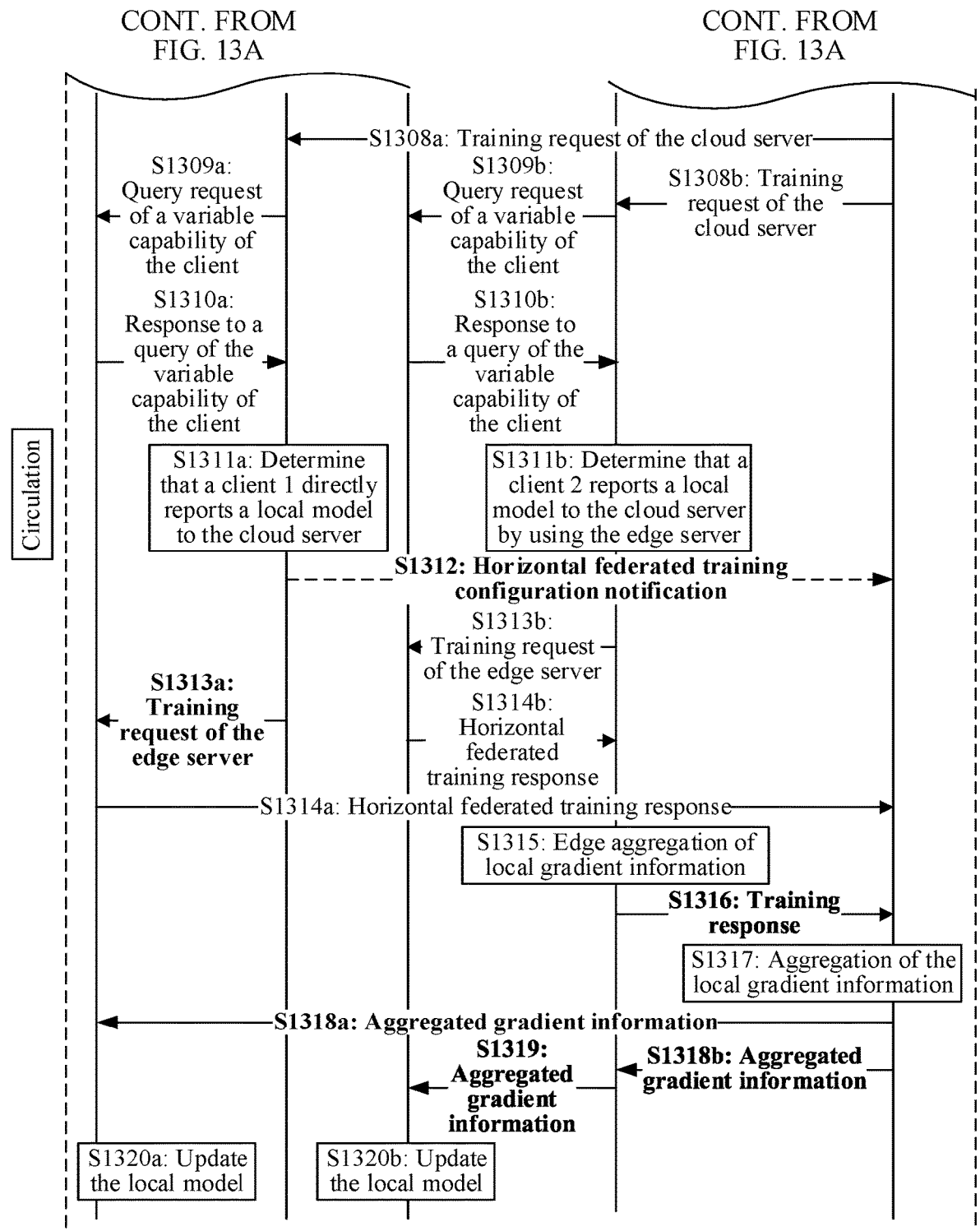

The following describes specific implementation of this solution when the server is a cloud server (FIG. 12A and FIG. 12B) and an edge server (FIG. 13A and FIG. 13B).

FIG. 12A and FIG. 12B are a schematic flowchart of a federated learning training method 1200 according to this application. In the method, a cloud server determines a manner of reporting model information by a client, so that horizontal federated training efficiency can be effectively improved.

S1201 (S1201a and S1201b): Registration of an inherent capability of a client.

Specifically, the client sends request information to a cloud server. The request information is used to register the inherent capability of the client with the cloud server. The inherent capability (second capability information) may include, for example, a capability of a client that supports horizontal federated learning, an algorithm type that is supported by the client and that is of horizontal federated learning, location information of the client, and the like.

Optionally, the request information may be carried in an inherent capability registration request message or another message. This is not limited in this application.

It should be noted that the inherent capability may be understood as a static capability, that is, inherent capability information of the client does not dynamically change with time.

S1202 (S1202a and S1202b): Response to the registration of the inherent capability of the client.

Specifically, after receiving the inherent capability information of the client, the cloud server sends a response message to the client. The response message notifies the client that the inherent capability information of the client has been registered successfully.

Optionally, the response message may be a response message to the registration of the inherent capability of the client.

S1203 (S1203a and S1203b): Registration of an inherent capability of an edge server.

Specifically, the edge server sends request information to the cloud server. The request information is used to register the inherent capability of the edge server with the cloud server. The inherent capability may include, for example, a supported horizontal federated learning algorithm type, a capability of an edge server that supports horizontal federation, a service region, a list of identifiers of clients in the service region, and the like.

Optionally, the request information may be carried in an inherent capability registration request message or another message. This is not limited in this application.

S1204 (S1204a and S1204b): Response to the registration of the inherent capability of the edge server.

Specifically, after receiving inherent capability information of the edge server, the cloud server sends a response message to the edge server. The response message notifies the edge server that the inherent capability information of the edge server has been registered successfully.

Optionally, the response message may be a response message to the registration of the inherent capability of the edge server.

S1205 (S1205a and S1205b): Query of a variable capability of the client.

Specifically, the cloud server sends query request information to the client. The query request information is used to query the variable capability (first capability information) of the client. The variable capability may include, for example, a memory size, a hard disk size, a computing capability, load, channel bandwidth between the client and the cloud server, and the like.

Optionally, the query request information may be carried in a variable capability query request message or another message. This is not limited in this application.

It should be understood that the cloud server may query the client for dynamic capability information of the client in a plurality of periods of time.

S1206 (S1206a and S1206b): Response to the query of the variable capability of the client.

Specifically, after receiving variable capability query information, the client sends a response message to the cloud server. The response message is used to report variable capability information of the client.

Optionally, the response message may be a response message to the query of the variable capability of the client.

It should be understood that, because the variable capability information of the client queried by the cloud server may be variable capability information of the client in a plurality of periods of time, the client needs to report the variable capability information in the plurality of periods of time.

S1207 (S1207a and S1207b): Query of a variable capability of the edge server.

Specifically, the cloud server sends query request information to the edge server. The query request information is used to query the variable capability of the edge server. The variable capability may include, for example, a memory size, a hard disk size, a computing capability, load, channel bandwidth between the edge server and the cloud server, and the like.

Optionally, the query request information may be carried in a variable capability query request message or another message. This is not limited in this application.

Similarly, the cloud server may also query variable capability information of the edge server in a plurality of periods of time that are the same as that in step 1204.

S1208 (S1208a and S1208b): Response to the query of the variable capability of the edge server.

Specifically, after receiving variable capability query information, the edge server sends a response message to the cloud server. The response message is used to report the variable capability information of the edge server.

Optionally, the response message may be a response message to the query of the variable capability of the edge server.

Similarly, the variable capability information of the edge server queried by the cloud server is variable capability information of the edge server in a plurality of periods of time. The period of time is a time during which the cloud server prepares to perform horizontal federated learning training, and is the same as the period of time in step 1205. The preparation indicates that the cloud server may finally select one subperiod of time from the plurality of periods of time to perform horizontal federated learning training.

S1209: The cloud server determines that a first client reports model information to the cloud server and a second client reports model information to the cloud server by using the edge server.

Specifically, the cloud server determines, based on the variable capability information of the client and the variable capability information of the edge server that are respectively obtained in step 1206 and step 1208, a list of clients that participate in training, and determines whether a type of each client in the list belongs to the first client or the second client.

It should be understood that, when determining the first client and the second client, the cloud server compares obtained variable capability information with a variable capability threshold of the client that is pre-stored in the cloud server. As long as a piece of variable capability information in the obtained variable capability information is less than the threshold, the cloud server may determine that a client is the second client; otherwise, the cloud server may determine that a client is the first client.

For example, a memory size threshold of the client pre-stored in the cloud server may be 1 GB, a hard disk size threshold may be 12 GB, a computing capability (for example, a quantity of GPUs) threshold may be 4, a load threshold may be 3, and a bandwidth threshold between the client and the cloud server may be 5 Mbit/s.

It should be understood that the foregoing thresholds are merely examples instead of limitations. The threshold pre-stored in the cloud server may change based on a feature of a device or another factor. This is not limited in this application.

It should be understood that the first client and the second client in the foregoing represent a type of clients. In an extreme case, when there is only one in the type of clients, the first client and the second client may also represent a single client. The first client represents a type of clients that directly report the model information to the cloud server, and the second client represents a type of clients that need to report the model information to the edge server, and the edge server aggregates the model information and then reports an aggregated model to the cloud server.

It should be further noted that, when determining a client that needs to participate in training, the cloud server may randomly select, from queried clients, a needed quantity of clients to participate in final training. In other words, the cloud server does not necessarily use all the queried clients for training, but randomly selects a subset of the queried clients.

S1210: The cloud server separately sends a horizontal federated model training request to the first client and the second client.

Specifically, in S1210a, when the client is the first client, a horizontal federated model training request message sent by the cloud server may include at least one of the following information: algorithm information (for example, linear regression), an initial model file, a training data length, and cloud aggregation point indication information.

The initial model file is $\Theta_A, \Theta_B, \ldots, \Theta_K$, and the like that are used by each client to generate a local model in a horizontal federated learning training process in FIG. 3. The training data length is a quantity of pieces of data that participates in training in each client, that is, $n_I$ in FIG. 3. The cloud aggregation point indication information indicates the client to report a local gradient value and the training data length to the cloud server. The cloud aggregation point indication information is an example of first indication information, and may include address information of the cloud server.

In S1210b, when the client is the second client, the horizontal federated model training request message sent by the cloud server may include at least one of the following information: algorithm information (for example, linear regression), an initial model file, a training data length, edge aggregation point indication information, and an identifier of the edge server.

The initial model file and the training data length are the same as those in the foregoing descriptions. The edge aggregation point indication information indicates that the client needs to report the model information to the edge server, and may be an example of second indication information. The identifier of the edge server is used to locate or indicates the edge server to which the client reports the model information.

It should be understood that identification information of the edge server indicates the second client to report the model information to an edge server corresponding to the identification information.

S1211: Horizontal federated model training configuration notification.

Specifically, for step 1210b, the cloud server may send the horizontal federated model training configuration notification to the edge server. The message may be an example of third indication information, and the message may include identification information of the second client, for example, address information of the second client. The notification message indicates the edge server to report model information of the edge server. It should be understood that the edge server needs to wait for the second client to report the model information, aggregate the model information of the second client, and then report an aggregated model to the cloud server.

It should be noted that, because the cloud server may communicate with a plurality of edge servers, the message may further carry address information of the cloud server. The address information may be an Internet Protocol IP address and/or a channel port number used by the cloud server to communicate with the edge server.

It should be understood that step 1211 may be performed before step 1210 or after step 1210, that is, there is no necessary sequence between step 1210 and step 1211. However, it should be noted that the foregoing two steps need to be performed before step 1212. In other words, before the client reports the model information to the cloud server or the edge server, the training request and the training configuration need to be completed.

S1212 (S1212a and S1212b): Horizontal federated training response.

Specifically, in S1212a, the first client sends locally updated gradient information $\partial L_I/\partial \Theta_I$ and training data length $n_I$ (model information of the client) to a corresponding cloud server.

In S1212b, the second client sends locally updated gradient information $\partial L_I/\partial \Theta_I$ and training data length $n_I$ to a corresponding edge server.

S1213: Edge aggregation of local gradient information.

Specifically, the edge server aggregates, based on information reported in step 1212b, the model information reported by a client (that is, the second client) responsible for a local domain. For an aggregation formula, the formula in step 3 in FIG. 3 is still used. Details are not described herein again.

S1214: Horizontal federated model training response.

Specifically, after aggregating the model information of the second client, the edge server generates aggregated gradient information, that is, the model information of the edge server, and reports the model information of the edge server to the cloud server by using a horizontal federated model training response message.

S1215: Aggregation of the local gradient information.

Specifically, the cloud server performs final aggregation on the model information of the first client and the model information reported by the edge server. For an aggregation method, step 3 in FIG. 3 may still be used. To be specific, the aggregated gradient information $$\frac{1}{\|K\|}\sum_I \frac{\partial L_I}{\partial \Theta_I} * P_I,$$

that is, target model information of the cloud server, is obtained.

It should be noted that, in an aggregation process, a client can report the model information in only one manner.

S1216 (S1216a and S1216b): The cloud server sends the aggregated gradient information to the first client and the edge server.

Specifically, the cloud server sends, to the first client and the edge server, the aggregated gradient information $$\frac{1}{\|K\|}\sum_I \frac{\partial L_I}{\partial \Theta_I} * P_I$$

obtained in step 1215.

S1217: The edge server sends the aggregated gradient information to the second client.

Specifically, the edge server forwards, to the second client, the gradient information received from the cloud server.

S1218 (S1218a and S1218b): The first client and the second client update the model information.

Specifically, after obtaining the aggregated gradient information sent by the cloud server, the first client and the second client replace local $\Theta_I$ based on step 4 in FIG. 3.

It should be understood that step 1218a and step 1218b may not be performed simultaneously. In other words, after receiving the aggregated gradient information sent by the cloud server, the first client may start an update process, and does not need to perform an update operation simultaneously with the second client.

It should be noted that, in this embodiment, the edge server is an edge server serving the second client, that is, the second client is located in an area of a service region of the edge server. Because second clients may be located in different regions and there may be one or more second clients, there may also be one or more edge servers.

In this embodiment of this application, the cloud server flexibly selects, based on the variable capability information of the client and the edge server, a manner of reporting the model information by the client, so that access pressure of the cloud server can be alleviated, and horizontal federated training efficiency can be improved.

FIG. 13A and FIG. 13B are a schematic flowchart of a federated learning training method 1300 according to this application. In the method, an edge server determines a manner of reporting model information by a client, so that horizontal federated training efficiency can be effectively improved.

S1301 (S1301a and S1301b): Registration request of an inherent capability of the client.

Specifically, each client of horizontal federated learning in a coverage area of the edge server registers inherent capability information with the edge server, for example, may include a capability of a client that supports horizontal federated learning, an algorithm type that is supported by the client and that is of that horizontal federated learning, a client location, and the like.

Optionally, the client may report an inherent capability by sending a first message to the edge server. The first message may be a client inherent capability registration request message that carries the inherent capability of the client.

S1302 (S1302a and S1302b): Response to registration of the inherent capability of the client.

Specifically, after the edge server receives the inherent capability information reported by the client in the coverage area of the edge server, the edge server sends a response message to the client, to indicate that the inherent capability of the client is registered successfully. Optionally, the response message may be a response message to the registration of the inherent capability of the client.

S1303 (S1303a and S1303b): Registration request of an inherent capability of the edge server.

Specifically, each edge server of horizontal federated learning registers inherent capability information with the cloud server of horizontal federated learning. For example, the inherent capability information may include a supported horizontal federated learning algorithm type, a capability of an edge server that supports horizontal federation, a service region, a list of identifiers of clients in the service region and the like.

S1304 (S1304a and S1304b): Response to registration of the inherent capability of the edge server.

Specifically, the cloud server sends a response message to each edge server. The response message indicates that the cloud server receives inherent capability information of the edge server.

Optionally, the response message may be a response message to the registration of the inherent capability of the edge server.

S1305 (S1305a and S1305b): Query of a variable capability of the edge server.

Specifically, the cloud server sends query request information to each edge server. The query request information is used to query the variable capability of the edge server. The variable capability may include, for example, a memory size, a hard disk size, a computing capability, load, channel bandwidth between the edge server and the cloud server, and the like.

Optionally, the query request information may be carried in a variable capability query request message of the edge server or another message. This is not limited in this application.

It should be understood that variable capability information that is of the edge server and that is queried by the cloud server may be variable capability information of the edge server in a period of time. Finally, the cloud server may select a period in the period of time as a time for horizontal federated learning training.

S1306 (S1306a and S1306b): Response to the query of the variable capability of the edge server.

Specifically, after receiving variable capability query information sent by the cloud server, the edge server sends a response message to the cloud server. The response message is used to report the variable capability information of the edge server.

Optionally, the response message may be a response message to the query of the variable capability of the edge server.

It should be understood that the variable capability information reported by the edge server should be the variable capability information in the period of time queried by the cloud server in step 1305.

S1307: Determine a quantity of clients aggregated by each edge server and/or a total data length.

Specifically, the cloud server determines, after being based on the variable capability information that is of the edge server in a training period of time and that is obtained in step 1306, a quantity of clients that need to be aggregated by each edge server and/or a total data length.

It should be noted that the quantity of clients that need to be aggregated indicates a quantity of clients that participate in training. Some of these clients may directly report the model information to the cloud server, and some may also report the model information to the edge server. The edge server first aggregates, and then reports aggregated model information of the edge server to the cloud server, and the cloud server performs unified aggregation. The total data length represents a sum of quantities of pieces of data in the clients that need to be aggregated by the edge server.

In addition, a prerequisite that the cloud server can determine the quantity of clients aggregated by each edge server and/or the total data length is that the cloud server may determine, based on the variable capability information reported by the edge server, load information, memory information, computing capability information or hard disk information needed by each edge server.

S1308 (S1308a and S1308b): Training request of the cloud server.

Specifically, the cloud server sends a horizontal federated training request to each edge server, including algorithm information, an initial model, a quantity of needed clients, and/or a needed data length.

S1309 (S1309a and S1309b): Query request of the variable capability of the client.

Specifically, the edge server sends a query request message to the client, to query a variable capability of the client. The variable capability may include a memory size, a hard disk size, a computing capability, load, channel bandwidth between the client and the cloud server, and the like.

Optionally, the query request message may be a variable capability query request message of the client.

It should be understood that the variable capability in this step is a variable capability in a period of time queried by the cloud server.

S1310 (S1310a and S1310b): Response to the query of the variable capability of the client.

Specifically, the client reports, to the edge server corresponding to the client by using the response message, the variable capability of the client in a period of time in which the cloud server performs training.

Optionally, the response message may be a response message to the query of the variable capability of the client.

S1311 (S1311a and S1311b): Determine a manner of reporting the model information by the client.

Specifically, each edge server determines, based on requirement information in step 1308 and information obtained in step 1310, which the client of horizontal federated learning in the coverage area can directly report the model information to the cloud server, for example, a first client in an edge server A in FIG. 13A and FIG. 13B, or the edge server determines which client of horizontal federated learning in the coverage area can aggregate, to the cloud server by using the local edge server, an aggregated model, for example, a second client in an edge server B in FIG. 13A and FIG. 13B.

It should be noted that the determining process is roughly the same as the process of determining the first client and the second client by the cloud server in FIG. 12A and FIG. 12B. A difference lies in that a threshold of the variable capability information is pre-stored in the edge server in this embodiment. When the edge server determines that queried variable capability information of the client is greater than the threshold, the edge server determines the client as an example of the first client; otherwise, the edge server determines the client as an example of the second client. In addition, the quantity of clients that participates in training may be randomly selected from a queried client based on a requirement of the cloud server.

It should be understood that the edge server A may still have a client type, that is, the second client, in which the edge server A first aggregates the model information and then reports the aggregated model to the cloud server. Similarly, the first client may also exist in the edge server B. In other words, the edge server may determine a quantity of first clients and a quantity of second clients of the edge server based on the requirement of the cloud server and the variable capability of the client. Therefore, FIG. 13A and FIG. 13B are merely for clearer representation or for ease of description, and does not draw other steps. A person skilled in the art may also clearly understand that the figure is an example rather than a limitation.

S1312: Horizontal federated training configuration notification.

Specifically, each edge server sends the horizontal federated training configuration notification to the cloud server, to notify the cloud server that the cloud server needs to wait for the first client to report the model information. The notification message may include identification information of the first client.

It should be understood that, when the first client exists in clients within the range of the edge server, the edge server needs to send the configuration notification message to the cloud server, so that the cloud server can clearly know the client that directly reports the model information, and a training time and training efficiency can be saved.

It should be understood that step 1312 in FIG. 13A and FIG. 13B is merely for brevity and does not show a same operation of another client. Therefore, FIG. 13A and FIG. 13B should not constitute a limitation on the implementation solution of this application.

S1313 (S1313a and S1313b): Training request of the edge server.

Specifically, the edge server sends the horizontal federated training request to the client. For the first client, in step 1313a, the request message sent by the edge server may include algorithm information (for example, linear regression), an initial model file, a training data length, cloud aggregation point indication information, and an identifier of the cloud server. For the second client, in step 1313b, the request message sent by the edge server may include the algorithm information (for example, the linear regression), the initial model file, the training data length, and edge aggregation point indication information.

S1314 (S1314a and S1314b): Horizontal federated training response.

Specifically, in step 1314a, the first client sends local gradient information $\partial L_I/\partial \Theta_I$ and the training data length $n_I$ to a corresponding cloud server. Step 1314b: The second client sends the local gradient information $\partial L_I/\partial \Theta_I$ and the training data length $n_1$ to a corresponding edge server.

S1315: Edge aggregation of the local gradient information.

Specifically, after the edge server receives, in step 1314, the model information of the client that is sent by the second client, that is, the local gradient information and the training length, the edge server first aggregates the local gradient information by using step 3 in FIG. 3.

S1316: Training response.

Specifically, the edge server reports, to the cloud server, aggregated model information of the edge server. The model information of the edge server may be carried in a training response message.

S1317: Aggregation of the local gradient information.

Specifically, the cloud server performs final aggregation on model information of the first client and model information reported by the edge server. For an aggregation method, step 3 in FIG. 3 may still be used. To be specific, aggregated gradient information $$\frac{1}{\|K\|} \sum_I \frac{\partial L_I}{\partial \Theta_I} * P_I$$

is obtained.

S1318 (S1318a and S1318b): The cloud server sends the aggregated gradient information to the first client and the edge server.

Specifically, the cloud server sends, to the first client and the edge server, the aggregated gradient information $$\frac{1}{\|K\|} \sum_I \frac{\partial L_I}{\partial \Theta_I} * P_I$$

obtained in step 1015.

S1319: The edge server sends the aggregated gradient information to the second client.

Specifically, the edge server forwards, to the second client, the gradient information received from the cloud server.

S1320 (S1320a and S1320b): The first client and the second client update the model information.

Specifically, after obtaining the aggregated gradient information sent by the cloud server, the first client and the second client replace local $\Theta_1$ based on step 4 in FIG. 3.

It should be understood that step 1320a and step 1320b may not be performed simultaneously. In other words, after receiving the aggregated gradient information sent by the cloud server, the first client may start an update process, and does not need to perform an update operation simultaneously with the second client.

It should be noted that, in this embodiment, the edge server is an edge server serving the second client, that is, the second client is located in an area of a service region of the edge server. Because second clients may be located in different regions and there may be one or more second clients, there may also be one or more edge servers.

In this embodiment of this application, the edge server flexibly selects, based on the variable capability information of the client and the requirement of the cloud server, a manner of reporting the model information by the client, so that access pressure of the cloud server can be alleviated, and horizontal federated training efficiency can be improved.

The method provided in embodiments of this application is described above in detail with reference to FIG. 10 to FIG. 13A and FIG. 13B. A model training apparatus provided in embodiments of this application is described below in detail with reference to FIG. 14 and FIG. 17.

Figure 14:
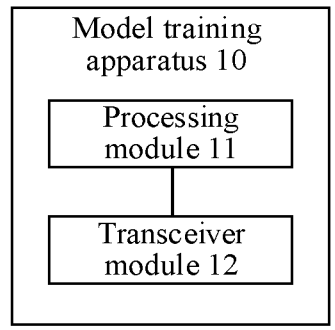
FIG. 14 is a schematic block diagram of an example of a server according to this application.

FIG. 14 is a schematic block diagram of a model training apparatus according to an embodiment of this application. As shown in the figure, a model training apparatus 10 may include a processing module 11 and a transceiver module 12.

In a possible design, the model training apparatus 10 may correspond to the server in the foregoing method embodiments.

Specifically, the model training apparatus 10 may correspond to the server in the method 1000, the method 1100, the method 1200, and the method 1300 in embodiments of this application. The model training apparatus 10 may include a module configured to perform the method performed by the server in the method 1000 in FIG. 10, the method 1100 in FIG. 11, the method 1200 in FIG. 12A and FIG. 12B, or the method 1300 in FIG. 13A and FIG. 13B. In addition, units in the model training apparatus 10 and the foregoing other operations and/or functions are respectively intended to implement corresponding procedures of the method 1000 in FIG. 10, the method 1100 in FIG. 11, the method 1200 in FIG. 12A and FIG. 12B, or the method 1300 in FIG. 13A and FIG. 13B.

When the model training apparatus 10 is configured to perform the method 1000 in FIG. 10, the processing module 11 may be configured to perform step 1001 and step 1002 in the method 1000. The transceiver module 12 may be configured to perform step 1003 in the method 1000.

When the model training apparatus 10 is configured to perform the method 1100 in FIG. 11, the processing module 11 may be configured to perform step 1101 and step 1102 in the method 1100. The transceiver module 12 may be configured to perform step S1103 in the method 1100.

When the model training apparatus 10 is configured to perform the method 1200 in FIG. 12A and FIG. 12B, the processing module 11 may be configured to perform step 1209 and step 1215 in the method 1200. The transceiver module 12 may be configured to perform step 1201 to step 1208, step 1210, step 1211, step 1214, and step 1216 in the method 1200.

When the model training apparatus 10 is configured to perform the method 1300 in FIG. 13A and FIG. 13B, the processing module 11 may be configured to perform step 1311 and step 1315 in the method 1300. The transceiver module 12 may be configured to perform step 1301 to step 1330, step 1306, step 1308 to step 1310, step 1312 to step 1314, step 1316, step 1318, and step 1319 in the method 1300.

Figure 15:
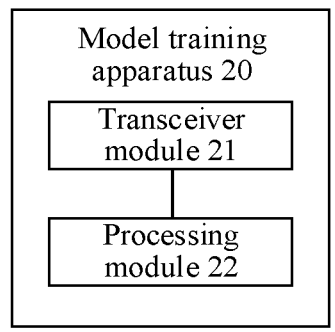
FIG. 15 is a schematic block diagram of an example of a cloud server according to this application.

FIG. 15 is a schematic block diagram of a model training apparatus according to an embodiment of this application. As shown in the figure, a model training apparatus 20 may include a transceiver module 21 and a processing module 22.

In a possible design, the model training apparatus 20 may correspond to the cloud server in the foregoing method embodiments, or may be configured in a chip in the cloud server.

Specifically, the model training apparatus 20 may correspond to the server in the method 1000, the method 1100, and the method 1200 in embodiments of this application. The model training apparatus 20 may include a module configured to perform the method performed by the server in the method 1000 in FIG. 10, the method 1100 in FIG. 11, or the method 1200 in FIG. 12A and FIG. 12B. In addition, units in the model training apparatus 20 and the foregoing other operations and/or functions are respectively intended to implement corresponding procedures of the method 1000 in FIG. 10, the method 1100 in FIG. 11, or the method 1200 in FIG. 12A and FIG. 12B.

When the model training apparatus 20 is configured to perform the method 1000 in FIG. 10, the transceiver module 21 may be configured to perform step 1003 in the method 1000. The processing module 22 may be configured to perform step 1001 and step 1002 in the method 1000.

When the model training apparatus 20 is configured to perform the method 1100 in FIG. 11, the transceiver module 21 may be configured to perform step 1103 in the method 1100. The processing module 22 may be configured to perform step 1101 and step 1102 in the method 1100.

When the model training apparatus 20 is configured to perform the method 1200 in FIG. 12A and FIG. 12B, the processing module 22 may be configured to perform step 1209 and step 1215 in the method 1200. The transceiver module 21 may be configured to perform step 1201 to step 1208, step 1210, step 1211, step 1214, and step 1216 in the method 1200.

Figure 16:
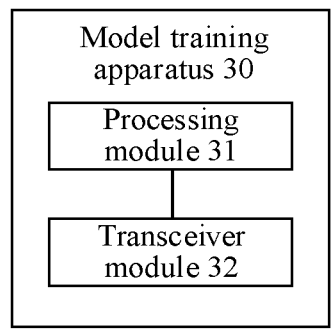
FIG. 16 is a schematic block diagram of an example of an edge server according to this application.

FIG. 16 is a schematic block diagram of a model training apparatus according to an embodiment of this application. As shown in the figure, a model training apparatus 30 may include a processing module 31 and a transceiver module 32.

In a possible design, the model training apparatus 30 may correspond to the edge server in the foregoing method embodiments.

Specifically, the model training apparatus 30 may correspond to the server in the method 1000, the method 1100, and the method 1300 in embodiments of this application. The model training apparatus 30 may include a module configured to perform the method performed by the server in the method 1000 in FIG. 10, the method 1100 in FIG. 11, or the method 1300 in FIG. 13A and FIG. 13B. In addition, units in the model training apparatus 30 and the foregoing other operations and/or functions are respectively intended to implement corresponding procedures of the method 1000 in FIG. 10, the method 1100 in FIG. 11, or the method 1300 in FIG. 13A and FIG. 13B.

When the model training apparatus 30 is configured to perform the method 1000 in FIG. 10, the processing module 31 may be configured to perform step 1001 and step 1002 in the method 1000. The transceiver module 32 may be configured to perform step 1003 in the method 1000.

When the model training apparatus 30 is configured to perform the method 1100 in FIG. 11, the processing module 31 may be configured to perform step 1101 and step 1102 in the method 1100. The transceiver module 32 may be configured to perform step S1103 in the method 1100.

When the model training apparatus 30 is configured to perform the method 1300 in FIG. 13A and FIG. 13B, the processing module 31 may be configured to perform step 1311 and step 1315 in the method 1300. The transceiver module 32 may be configured to perform step 1301 to step 1330, step 1306, step 1308 to step 1310, step 1312 to step 1314, step 1316, step 1318, and step 1319 in the method 1300.

Figure 17:
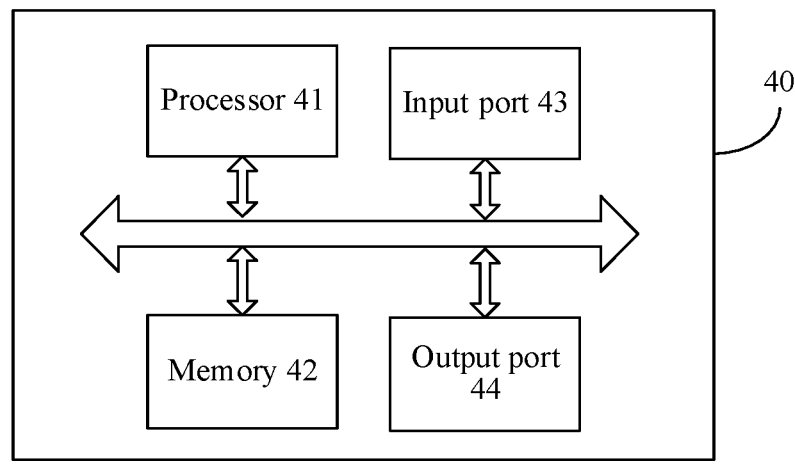
FIG. 17 is a schematic diagram of a model training apparatus according to an embodiment of this application.

According to the foregoing methods, FIG. 17 is a schematic diagram of a model training apparatus 40 according to an embodiment of this application. As shown in FIG. 17, the apparatus 40 may be a model training device.

The apparatus 40 may include a processor 41 (namely, an example of a processing module) and a memory 42. The memory 42 is configured to store instructions, and the processor 41 is configured to execute the instructions stored in the memory 42, so that the apparatus 40 implements the steps performed by the server in the method corresponding to FIG. 10, FIG. 11, FIG. 12A and FIG. 12B, or FIG. 13A and FIG. 13B.

Further, the apparatus 40 may further include an input port 43 (namely, an example of a transceiver module) and an output port 44 (namely, another example of the transceiver module). Further, the processor 41, the memory 42, the input port 43, and the output port 44 may communicate with each other through an internal connection path, to transmit a control and/or data signal. The memory 42 is configured to store a computer program. The processor 41 may be configured to invoke the computer program from the memory 42 and run the computer program, to control the input port 43 to receive a signal, and control the output port 44 to send a signal, to complete the steps of the server in the foregoing methods. The memory 42 may be integrated into the processor 41, or the memory 42 and the processor 41 may be disposed separately.

Optionally, the input port 43 may be a receiver, and the output port 44 may be a transmitter. The receiver and the transmitter may be a same physical entity or different physical entities. When the receiver and the transmitter are the same physical entity, the receiver and the transmitter may be collectively referred to as a transceiver.

Optionally, if the model training apparatus 40 is a chip or a circuit, the input port 43 is an input interface, and the output port 44 is an output interface.

In an implementation, it may be considered that functions of the input port 43 and the output port 44 are implemented through a transceiver circuit or a dedicated transceiver chip. It may be considered that the processor 41 is implemented through a dedicated processing chip, a processing circuit, a processor, or a general-purpose chip.

In another implementation, it may be considered that the model training device provided in this embodiment of this application is implemented by using a general-purpose computer. To be specific, program code for implementing functions of the processor 41, the input port 43, and the output port 44 are stored in the memory 42, and a general-purpose processor implements the functions of the processor 41, the input port 43, and the output port 44 by executing the code in the memory 42.

The modules or units in the model training apparatus 40 may be configured to perform actions or processing processes performed by the server in the foregoing methods. To avoid repetition, detailed descriptions are omitted herein.

For concepts, explanations, detailed descriptions, and other steps of the apparatus 40 that are related to the technical solutions provided in embodiments of this application, refer to the descriptions of the content in the foregoing methods or other embodiments. Details are not described herein again.

Figure 18:
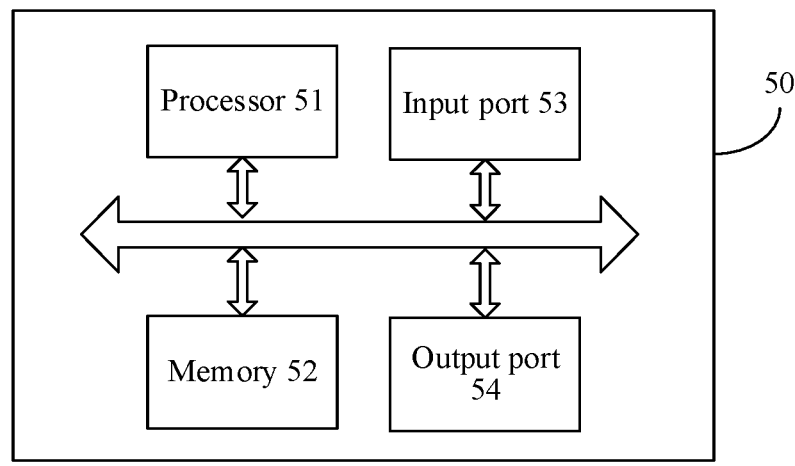
FIG. 18 is a schematic diagram of another model training apparatus according to an embodiment of this application.

According to the foregoing methods, FIG. 18 is a schematic diagram of a model training apparatus 50 according to an embodiment of this application. As shown in FIG. 18, the apparatus 50 may be a cloud server.

The apparatus 50 may include a processor 51 (namely, an example of a processing module) and a memory 52. The memory 52 is configured to store instructions, and the processor 51 is configured to execute the instructions stored in the memory 52, so that the apparatus 50 implements the steps performed by the server in FIG. 10, FIG. 11, FIG. 12A and FIG. 12B, or FIG. 13A and FIG. 13B.

Further, the apparatus 50 may further include an input port 53 (namely, an example of a transceiver module) and an output port 54 (namely, another example of the transceiver module). Further, the processor 51, the memory 52, the input port 53, and the output port 54 may communicate with each other through an internal connection path, to transmit a control and/or data signal. The memory 52 is configured to store a computer program. The processor 51 may be configured to invoke the computer program from the memory 52 and run the computer program, to control the input port 53 to receive a signal, and control the output port 54 to send a signal, to complete the steps of the server in the foregoing methods. The memory 52 may be integrated into the processor 51, or the memory 52 and the processor 51 may be disposed separately.

Optionally, the input port 53 may be a receiver, and the output port 54 may be a transmitter. The receiver and the transmitter may be a same physical entity or different physical entities. When the receiver and the transmitter are a same physical entity, the receiver and the transmitter may be collectively referred to as a transceiver.

Optionally, if the model training apparatus 50 is a chip or a circuit, the input port 53 is an input interface, and the output port 54 is an output interface.

In an implementation, it may be considered that functions of the input port 53 and the output port 54 are implemented through a transceiver circuit or a dedicated transceiver chip. It may be considered that the processor 51 is implemented through a dedicated processing chip, a processing circuit, a processor, or a general-purpose chip.

In another implementation, it may be considered that the cloud server provided in this embodiment of this application is implemented by using a general-purpose computer. To be specific, program code for implementing functions of the processor 51, the input port 53, and the output port 54 are stored in the memory 52, and a general-purpose processor implements the functions of the processor 51, the input port 53, and the output port 54 by executing the code in the memory 52.

The module or units in the model training apparatus 50 may be configured to perform actions or processing processes performed by the cloud server in the foregoing methods. To avoid repetition, detailed descriptions are omitted herein.

For concepts, explanations, detailed descriptions, and other steps of the apparatus 50 that are related to the technical solutions provided in embodiments of this application, refer to the descriptions of the content in the foregoing methods or other embodiments. Details are not described herein again.

Terminologies such as "component", "module", "system", and the like used in this specification indicate computer-related entities, hardware, firmware, a combination of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and the component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part of or all of the units may be selected based on actual requirements to achieve a purpose of the solutions of embodiments.

In addition, functional units in embodiments of this application may be integrated into one processing unit, each of the units may exist independently physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, an optical disc, or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A model training method, comprising:
   obtaining first capability information and second capability information of a client;
   determining a target server based on the first capability information and the second capability information, wherein the target server is a server to which the client reports model information, and the target server comprises a cloud server or an edge server; and
   sending indication information to the client, wherein the indication information indicates the client to report the model information of the client to the target server.

2. The model training method of claim 1, wherein
   the first capability information comprises at least one of the following information of the client:
   memory information, hard disk information, computing capability information, load information, or channel bandwidth information; or
   wherein the second capability information comprises at least one of the following information of the client:
   a federated learning client capability, a federated learning algorithm type, and region information.

3. The model training method of claim 1, the method further comprising:
   obtaining requirement information of the cloud server, wherein the requirement information comprises at least one of a quantity of clients or a data length of at least one client; and
   wherein the determining the target server based on the first capability information and the second capability information comprises:
   determining the target server based on the first capability information, the second capability information, and the requirement information.

4. The model training method of claim 1, wherein the indication information further comprises at least one of address information of the cloud server or address information of the edge server.

5. A model training method, comprising:
   receiving, by a cloud server, model information of a first client and model information of an edge server, wherein the model information of the edge server is determined based on model information of a second client;
   determining, by the cloud server, target model information based on the model information of the first client and the model information of the edge server; and
   sending, by the cloud server, the target model information to the first client and the edge server.

6. The model training of claim 5, the method further comprising:
   sending, by the cloud server to the first client, first indication information indicating the first client to report the model information of the first client to the cloud server.

7. The model training of claim 6, wherein the first indication information comprises address information of the cloud server.

8. The model training of claim 5, the method further comprising:

sending, by the cloud server to the second client, second indication information indicating the second client to report the model information of the second client to the edge server.

9. The model training of claim 8, wherein the second indication information comprises address information of the edge server.

10. The model training of claim 5, the method further comprising:

sending, by the cloud server to the edge server, third indication information indicating the edge server to report the model information of the edge server to the cloud server.

11. The model training of claim 10, wherein the third indication information comprises at least one of address information of the second client or address information of the cloud server.

12. The model training of claim 5, the method further comprising:

sending, by the cloud server, requirement information to the edge server, wherein the requirement information comprises at least one of a sum of a quantity of first clients and a quantity of second clients, or a sum of data lengths of the first clients and the second clients, and the requirement information is used to determine the first client and the second client.

13. A model training apparatus, comprising a processor and a memory, wherein the memory is configured to store a computer program that, when executed by the processor, cause the model training apparatus to:

obtain first capability information and second capability information of a client;

determine a target server based on the first capability information and the second capability information, wherein the target server is a server to which the client reports model information, and the target server comprises a cloud server or an edge server; and send indication information to the client, wherein the indication information indicates the client to report the model information of the client to the target server.

14. The model training apparatus of claim 13, wherein the first capability information comprises at least one of the following information of the client:

memory information, hard disk information, computing capability information, load information, and channel bandwidth information; or wherein the second capability information comprises at least one of the following information of the client:

a federated learning client capability, a federated learning algorithm type, and region information.

15. The model training apparatus of claim 13, wherein the computer program further cause the model training apparatus to:

obtain requirement information of the cloud server, wherein the requirement information comprises at least one of a quantity of clients or a data length of at least one client, wherein the target server is determined based on the requirement information as well as the first capability information and the second capability information.

16. The model training apparatus of claim 13, wherein the indication information further comprises at least one of address information of the cloud server or address information of the edge server.

* * * * *